US005471523A

United States Patent [19]

Smith et al.

[11] Patent Number: 5,471,523
[45] Date of Patent: Nov. 28, 1995

[54] TELEPHONE CALL AND VOICE PROCESSING SYSTEM

[75] Inventors: Bernard J. Smith, Sunnyvale; David B. Seager, San Jose; Raymond L. Tong, Milpitas; Thomas E. Rowley, San Jose, all of Calif.

[73] Assignee: Voysys Corporation, Fremont, Calif.

[21] Appl. No.: 91,893

[22] Filed: Jul. 14, 1993

[51] Int. Cl.$^6$ .............................. H04M 1/00; H04M 1/64
[52] U.S. Cl. ...................... 379/165; 379/166; 379/156; 379/67; 379/212
[58] Field of Search .................... 379/156–166, 379/210–214, 67, 88, 89

[56] References Cited

U.S. PATENT DOCUMENTS

| | | | |
|---|---|---|---|
| 3,985,959 | 10/1976 | Komine et al. | 379/94 |
| 4,371,752 | 2/1983 | Matthews et al. | 379/89 |
| 4,410,982 | 10/1983 | Fleischfresser et al. | 370/110.1 |
| 4,412,102 | 10/1983 | Ogawa et al. | 379/165 |
| 4,436,962 | 3/1984 | Davis et al. | 379/211 |
| 4,541,088 | 9/1985 | Sarson | 370/110.2 |
| 4,696,028 | 9/1987 | Morganstein et al. | 379/88 |
| 4,747,124 | 5/1988 | Ladd | 379/67 |
| 4,783,796 | 11/1988 | Ladd | 379/67 |
| 4,873,718 | 10/1989 | Barnett et al. | 379/156 |
| 4,879,743 | 11/1989 | Burke et al. | 379/142 |
| 4,908,850 | 3/1990 | Masson et al. | 379/88 |
| 4,922,519 | 5/1990 | Daudelin | 379/67 |
| 4,926,462 | 5/1990 | Ladd et al. | 379/67 |
| 4,996,709 | 2/1991 | Heep et al. | 379/160 |
| 5,027,391 | 6/1991 | O'Neill et al. | 379/373 |
| 5,073,923 | 12/1991 | Offers et al. | 379/165 |
| 5,099,509 | 3/1992 | Morganstein et al. | 379/84 |
| 5,113,396 | 5/1992 | Kagami | 370/110.2 |
| 5,117,451 | 5/1992 | Ladd et al. | 379/214 |
| 5,128,982 | 7/1992 | Dugdale et al. | 379/89 |
| 5,136,585 | 8/1992 | Nizamuddin et al. | 370/110.1 |
| 5,144,653 | 9/1992 | Masuoka | 379/113 |
| 5,163,083 | 11/1992 | Dowden et al. | 379/88 |
| 5,222,120 | 6/1993 | McLeod et al. | 379/88 |
| 5,260,990 | 11/1993 | McLampy et al. | 379/67 |
| 5,311,576 | 5/1994 | Brunson et al. | 379/89 |
| 5,325,422 | 6/1994 | Ladd et al. | 379/214 |
| 5,329,579 | 7/1994 | Brunson et al. | 379/88 |
| 5,388,151 | 2/1995 | Knalid et al. | 379/67 |

FOREIGN PATENT DOCUMENTS 3-255762  11/1991  Japan ..................................... 379/156

OTHER PUBLICATIONS

"Voice Mail/Call Processing Product Roundup", Robins, Teleconnect, Apr. 1988 pp. 87–121.
"Merlin Pentara 100", British Telecommunications Engineering, vol. 4, Jul. 1985, p. 121.

(List continued on next page.)

Primary Examiner—Jeffery A. Hofsass
Assistant Examiner—Scott L. Weaver
Attorney, Agent, or Firm—D'Alessandro & Ritchie

[57] ABSTRACT

The present invention provides a novel method and apparatus for interconnecting a telephone call and voice processing system ("CVPS") with a telephone key system control unit ("KSU"). A plurality of digital feature telephone ports of the KSU are connected to the CVPS. These connections provide two-way digital feature telephone call information and telephone audio paths between the CVPS and the KSU. The CVPS emulates digital feature telephones on each of these ports permitting the CVPS to automatically perform all of the functions available to a human user of one of the digital feature telephones. Optionally, interposed lines connected to telephone central office telephone lines may be used to provide some of the connections between the KSU and the CVPS. Additionally the CVPS may, through the fully emulated digital feature telephone ports, query the KSU, telephone extensions and telephone lines in order to determine set up parameters and thereby self configure itself upon installation or modification of the installation.

12 Claims, 8 Drawing Sheets

OTHER PUBLICATIONS

"Key Systems: A New Union Key Systems Have Been Upgraded w/T1 Intefaces and Voice Messaging", Communications Week, Sep. 17, 1990, p. 27, Schwartz.

"Voysys Devises Foray into Low–End Voice Processing Market", Voice Technology News, May 4, 1993, vol. 5, No. 9, ISSN 1045–1498.

"Dial–Pulse and Dual Tone Multifrequency (DTMF) Signaling", Electronics Engineers Handbook, 3rd Edition, pp. 22–88 to 22–95.

TELEPHONE CALL AND VOICE PROCESSING SYSTEM

BACKGROUND OF THE INVENTION

1. Field of the Invention

This invention relates to the field of telephone call and voice processing systems. More particularly it relates to a telephone voice mail and telephone call processing system adapted for use with a telephone key system.

2. The Prior Art

Multi-line customer telephone equipment is located at a telephone customer's place of business. Such equipment generally falls into one of two categories: PBX (Private Branch Exchange) or Key system. A PBX system in its simplest form simply routes 2-wire telephone connections among a number of standard 2-wire telephones. A telephone key system such as the Merlin™ and Merlin Plus™ available from the AT&T Corporation consist of a number of digital feature telephones in communication with a key system control unit ("KSU"). Digital communication paths between the digital feature telephones and the KSU provide information to the telephone regarding the status of the various telephone lines and extensions in the system. Separate audio communication paths (typically two per telephone) permit a telephone call and an intercom call to occur simultaneously at a digital feature telephone.

Voice mail systems are well known in the art. Such systems permit a number of users to share what is, in effect, a large random access telephone answering machine. Voice mail systems are difficult to implement for use with telephone key systems for a number of reasons. First, digital feature telephones generally do not generate audio DTMF tones when the number buttons (0–9, *, #) are pushed. Rather, key presses generate digital signals which travel over the digital signal paths—not the audio signal paths—to the KSU where they are processed and acted upon. If necessary, as in a telephone call, the KSU will translate the digital signals into audio DTMF tones and insert them on the audio of the outgoing telephone lines. Most voice mail systems are controlled by DTMF tones because DTMF tones provide the most practical approach to the control of voice mail systems, because they are commonly available on most telephones including public telephones.

Another difficulty with installing a voice mail system on a telephone key system relates to getting information on the status of the telephone lines and extensions as well as telephone audio into the KSU. Some voice mail systems (see, e.g., Ladd et al., U.S. Pat. No. 4,926,462) utilize a technique known as feature phone emulation. Ladd et al. uses a digital information connection between the voice mail system and a proprietary digital feature telephone port on a PBX to obtain call information regarding the ongoing call. No provision is made for obtaining information regarding other ongoing calls, nor is the voice connection made through the same emulated port. As a result, Ladd et al. utilizes a single emulated port together with a plurality of non-digital 2-wire ports to effect connections between a PBX telephone system and a voice mail system. Because it is relatively expensive to provide these non-digital 2-wire ports on a telephone key system, it is desirable to provide a telephone call and voice processing system which can be interfaced to a KSU directly through the proprietary digital feature telephone ports available on such systems.

BRIEF DESCRIPTION OF THE INVENTION

The present invention provides a novel method and apparatus for interconnecting a telephone call and voice processing system ("CVPS") with a telephone key system control unit ("KSU"). A plurality of digital feature telephone ports of the KSU are connected to the CVPS. These connections provide two-way digital feature telephone call information and telephone audio paths between the CVPS and the KSU. The CVPS emulates digital feature telephones on each of these ports permitting the CVPS to automatically perform all of the functions available to a human user of one of the digital feature telephones. Optionally, interposed lines connected to telephone central office telephone lines ("outside lines") may be used to provide some of the connections between the KSU and the CVPS. Additionally the CVPS may, through the fully emulated digital feature telephone ports, query the KSU, telephone extensions and telephone lines in order to determine set up parameters and thereby self configure itself upon installation or modification of the installation.

Accordingly, it is an object of the present invention to provide a telephone call and voice processing system which can be interfaced to a key telephone system through a plurality of digital feature telephone ports of the key telephone system unit.

It is another object of the present invention to provide a telephone call and voice processing system which can be interfaced to a key telephone system through a combination of central office telephone ports and digital feature telephone ports of the key telephone system unit.

It is a further object of the present invention to provide subscriber access to the telephone call and voice processing system over interposed lines.

It is a further object of the present invention to provide a telephone call and voice processing system which is capable of self-configuration for ease of installation.

It is a further object of the present invention to provide a telephone call and voice processing system which utilizes a plurality of digital feature telephone ports of the telephone key system unit to access audio and digital call processing signals through the use of full feature telephone emulation.

Further objects and advantages of the present invention will become apparent from a consideration of the drawings and ensuing description of the invention.

DESCRIPTION OF A PREFERRED EMBODIMENT

Those of ordinary skill in the art will realize that the following description of the present invention is illustrative only and is not intended to be in any way limiting. Other embodiments of the invention will readily suggest themselves to such skilled persons from an examination of the within disclosure.

Introduction

The present invention is directed to a system designed to provide call and voice processing capabilities to "key system" type telephone systems (the call and voice processing system of the present invention will be referred to herein as the "CVPS"). One preferred embodiment of the present invention is adapted specifically to provide automated call processing and voice mail features for the Merlin™ and Merlin Plus™ telephone key systems.

Figure 1:
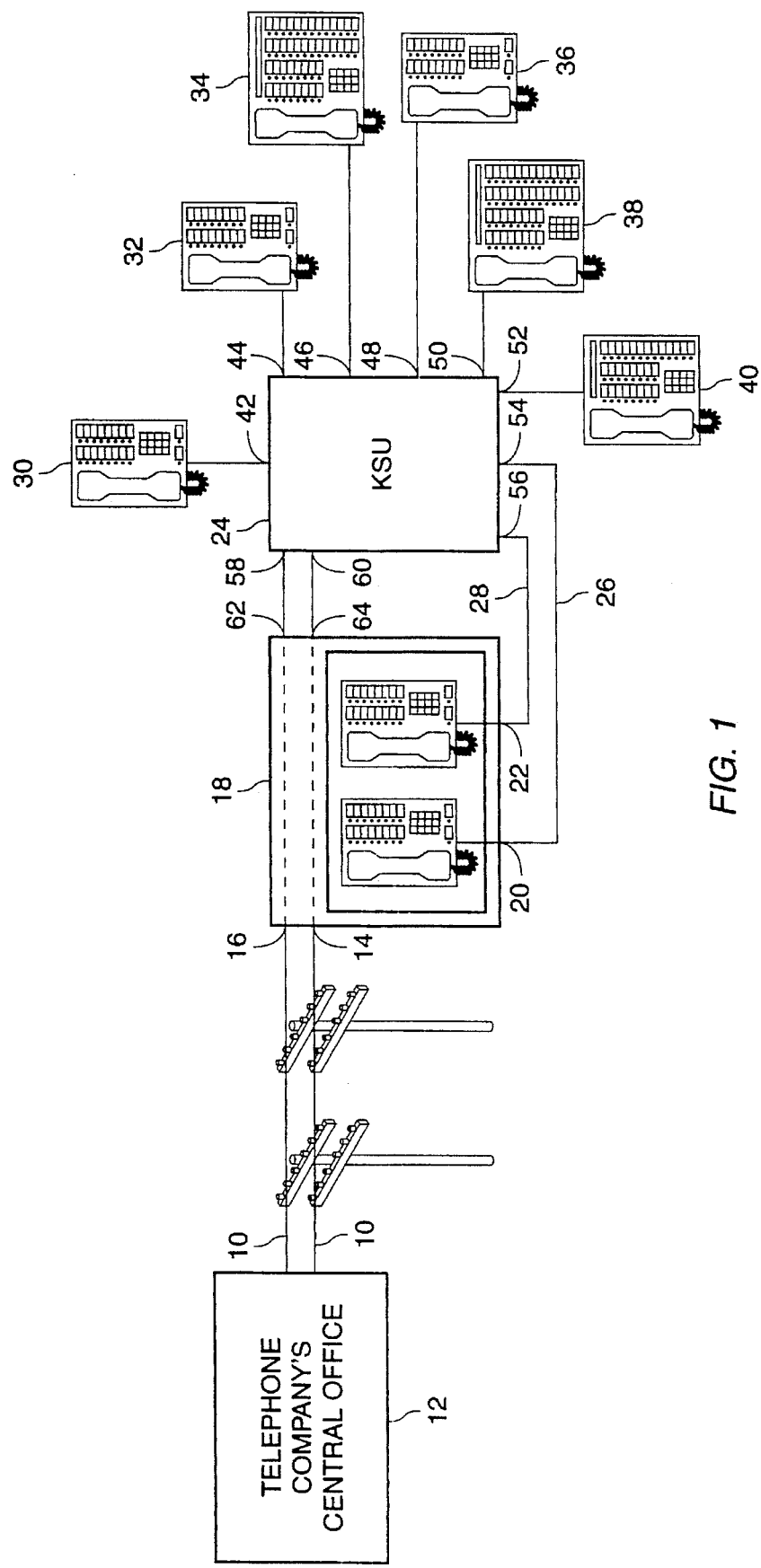
FIG. 1 is a schematic diagram of a telephone system embodying the present invention.

The CVPS connects to the key system control unit ("KSU") and the public telephone network as shown in FIG. 1.

The CVPS preferably connects to two or more (preferably 2–4) of the KSU's vacant digital feature telephone jacks or "ports". These connections appear as additional digital feature telephones to the KSU. Turning to FIG. 1, telephone company central office lines 10 from the telephone company central office 12 are connected in interposed fashion at interposed line-in ports 14, 16 to the CVPS 18. Full digital feature telephone emulation is provided by the CVPS 18 through telephone emulation ("TE") ports 20, 22. KSU 24 is connected to TE ports 20, 22 over TE lines 26, 28. Digital feature telephones 30, 32, 34, 36, 38 and 40 are connected to KSU 24 respectively through digital feature telephone ports 42, 44, 46, 48, 50 and 52. TE lines 26 and 28 are connected to digital feature telephone ports 54 and 56 of KSU 24. Central office line ports 58, 60 of KSU 24 are connected to interposed line-out ports 62, 64 of CVPS 18.

The ability of the CVPS to appear as additional fully functional digital feature telephones to KSU 24 is referred to as "full digital feature telephone emulation" or "TE". Full digital feature telephone emulation is a powerful tool that enables the CVPS to extract from the KSU all the digital call processing information that a typical human operator is given via their telephone's line and intercom status indicators. As a result, the CVPS may interact with the telephone system much like a live operator would. For example, the CVPS can electronically "hear" the ringing associated with the arrival of an incoming call, it can "see" which outside line the call is on, and it can "press" the ringing outside line key, answering the call, connecting the caller to the CVPS.

As the name implies, TE involves the CVPS emulating one (or multiple) digital feature telephones which are designed to operate with a particular type of KSU. Specifically, all the LED status changes (e.g. on, off, blinking, flashing, etc.) associated with the "keys" of a digital feature telephone, and all the ringing signals can be accurately detected by the CVPS. This provides a complete picture of the call situation of the entire phone system. On the other hand, the CVPS can send signals that represent key presses to the KSU, just like a human user will do when pressing keys on the telephone. This allows the CVPS to invoke the various call processing features supported by the KSU.

TE is implemented by connecting a digital feature telephone port of the KSU to a CVPS TE port. The TE port hardware is capable of communicating with the KSU on the physical level, while the CVPS software provides the intelligence for handling the protocol for the particular KSU. The same TE port controls both the call processing signalling and the actual voice connection. From the KSU's perspective, each TE port is just like another digital feature telephone. On the other hand, full digital feature telephone emulation supports all the features that can be invoked from a telephone, as well as establishing the voice connection. The latter offers great flexibility in terms of call coverage and system configuration. To have call coverage by the CVPS, simply replace one of the existing telephones with a connection to one of the TE ports. And depending on the requirement of the application, simultaneous call coverage can be obtained by simply adding more TE connections.

Figure 5:
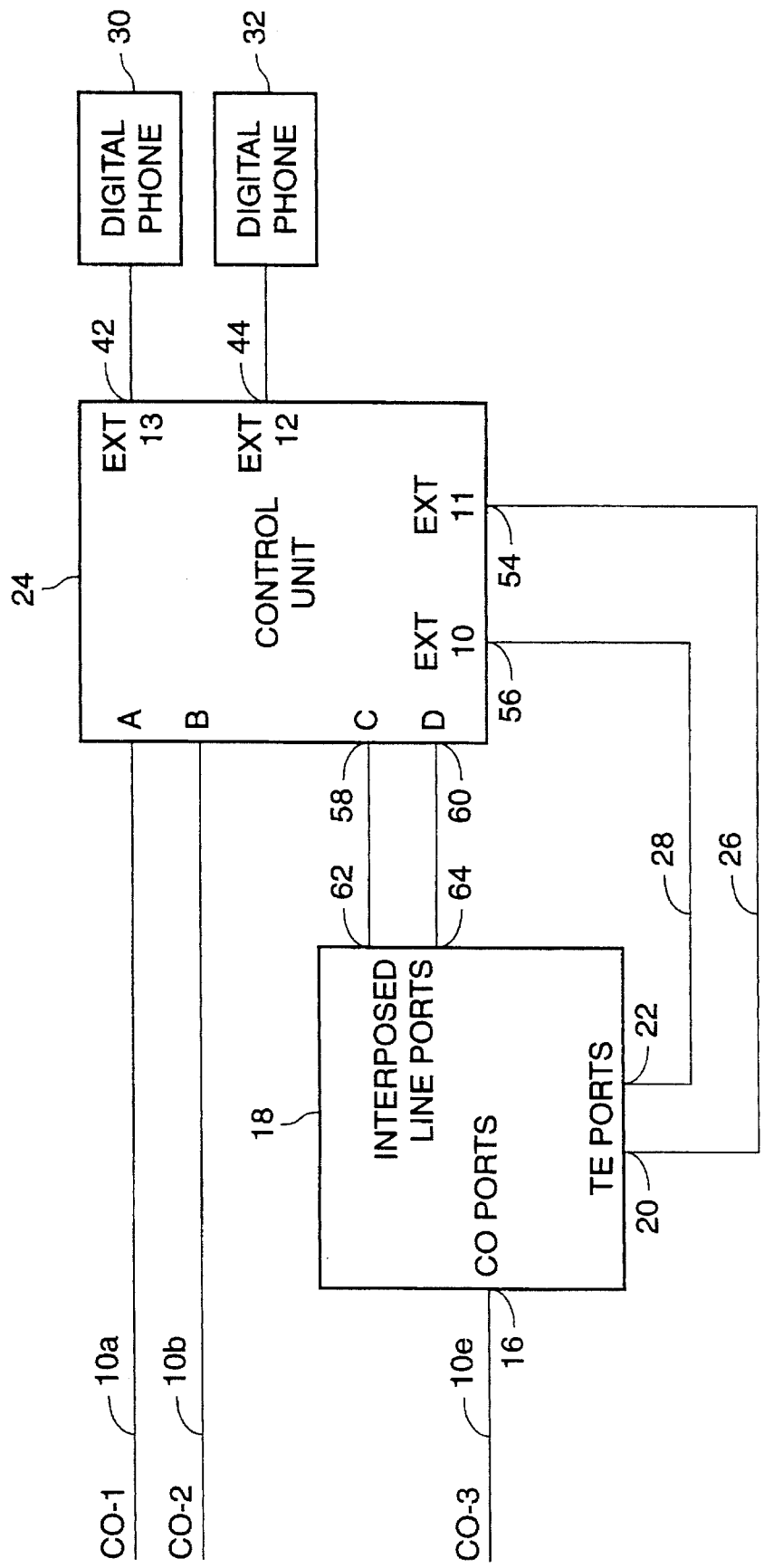
FIG. 5 is a block diagram of a telephone emulation connection between a key telephone system control unit and the telephone call and voice processing system also incorporating interposed lines.

FIG. 5 represents a typical configuration for providing call coverage with the CVPS. Shown in the diagram is a KSU 24 with three connections (A, B and C) to the telephone central office lines CO-1, CO-2 and CO-3 (10a, 10b and 10e, respectively) (port D is not connected to a central office telephone line, but is connected through a central office telephone line port directly to the CVPS 18) for receiving and making external calls. It also has two digital feature telephones (Ext. 12 (44) and 13 (42)), belonging to two users. The telephones are labelled 30, 32. Finally, it has two ports (Ext. 10 (56) and 11 (54)) connected to the CVPS TE ports 20, 22. To the KSU, these two connections look the same as two digital feature telephones.

When an external call arrives at the KSU from CO-1 (10a) at port A, the KSU will send signals to all telephones (including the CVPS TE ports) to set the LED of the corresponding key blinking. It also sends signals for the telephones to ring. This information is enough for the CVPS to be informed that there is an incoming call on port A. If the call is subsequently picked up by a human user, such as at Ext. 12 (44) or 13 (42), the KSU will send signals to the telephones to set the LED on, indicating that the call has been answered. On the other hand, if the call is not answered within a specified number of ring signals, the CVPS software will allocate one of its idle TE ports (e.g., Ext. 10 (56)) to answer the call. This is done by sending an off-hook signal via the selected TE port to the KSU. The KSU then connects the incoming call to the CVPS's TE port. The CVPS can then play the system greetings to prompt the user for action.

At this point, the caller can request to be transferred to, for example, Ext. 13, by entering the digits 1 and 3 from his key pad. The CVPS then proceeds to transfer the call by sending the signals to the KSU for invoking the transfer. It will also play a prompt to tell the caller that the call is being transferred. The KSU in turn executes the call transfer, and sends signals to the telephones to set the LED for port A to flashing, indicating that the caller is being put on hold while the transfer is going on. The CVPS continues to monitor the call. If the call to Ext. 13 is answered, as indicated by the appropriate LED turning on, the call transfer is deemed complete. On the other hand, if the call is not answered within a specified time-out period, the CVPS will send signals to the KSU to pick up the call, and then puts the caller into the voice mailbox of Ext. 13.

It is obvious that with TE, the CVPS can perform call coverage without any human operator intervention. The CVPS software implements the operator's function, with the TE emulating the operator's console.

Continuing with the above scenario, if a second call arrives at CO-2 (10b) while the first call is being processed by the CVPS, the CVPS software simply allocates another idle TE port (Ext. 11 (54)) to handle the second call.

Essentially this is like having two operators on duty. Depending on the business requirement, there can be as much simultaneous call coverage as the maximum number of TE ports available on the CVPS, and all this is achieved simply by plugging in the cables between the TE ports of the CVPS and the KSU.

In addition to the telephone emulation connections, the CVPS preferably connects to 2–4 of the KSU's central office line ports 58, 60. These are also referred to as "outside lines." The CVPS can connect either to unused central office line ports (e.g., FIG. 5, connection between ports 60 and 64), or if no vacant ports exist, the CVPS can be interposed between the incoming central office telephone lines 10 and the KSU's central office line ports 58, 60 as shown in FIG. 5 (connection between ports 58 and 62). The CVPS uses these connections to take advantage of the DTMF tone generation capabilities of the KSU's outside line interfaces. The CVPS requires DTMF tone signalling to process calls. When installed in the interposed manner, incoming calls pass through the CVPS unaffected; outgoing calls either pass through the CVPS or are intercepted. Calls are intercepted whenever an internal caller wants to connect directly to the CVPS (e.g., to retrieve a recorded message). Note that internal callers do not retrieve messages by calling the CVPS via the telephone emulation connections; this is because typical key system control units have restrictive call traffic capabilities on their internal intercom paths, and these paths generally do not transmit the DTMF tones needed to control the CVPS.

Operation of the telephone call and voice processing system

To explain how the CVPS uses telephone emulation to improve performance of its call and voice processing capabilities, discussions of several typical call and voice processing transactions follow.

Automatic answering of incoming calls

Incoming calls typically appear ringing on all key system telephones, including the telephones that the CVPS emulates. If an incoming call is not answered within a predetermined period or number of rings, the CVPS will answer the call and greet the caller; in this example, the call is answered at point 20 in FIG. 1—the TE port.

Voice processing systems that do not have telephone emulation capability typically answer incoming calls by intercepting the call between points 16 and 62—the interposed line-in port and the interposed line-out port. Intercepting a call in this manner effectively removes the call from the KSU's supervision, making it difficult to reconnect the caller to any of the internal telephones 30–40. In addition, answering a call via interception requires that the call arrive on a telephone line directly connected to the voice processing system; the CVPS can automatically answer any incoming call, regardless of which incoming line the call is on, because all lines appear on its emulated telephones.

Figure 7:
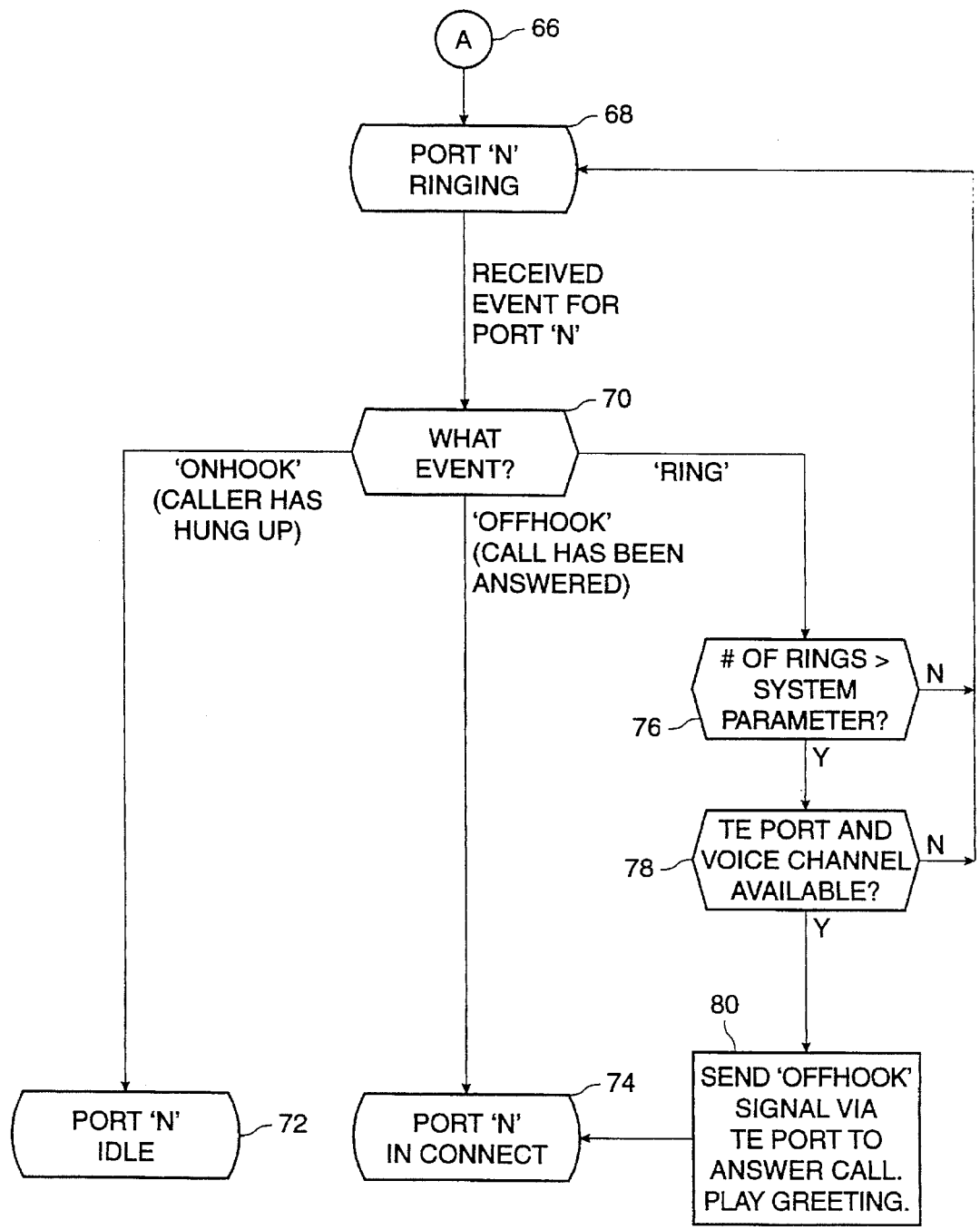
FIG. 7 is a flow chart showing how the telephone call and voice processing system would answer an incoming call via full digital feature telephone emulation.

Turning now to FIG. 7, a flow chart shows how the CVPS answers an incoming call by using the full digital feature telephone emulation technique. The routine is entered at point "A"66. Events such as the ringing of port "N" or the line attached to port "N" transitioning to on-hook or off-hook are detected at block 68. Block 70 decides what event has transpired and where the line has gone on-hook (i.e., the caller has hung up), control is transferred to block 72 and port "N" is now treated as idle by the CVPS. Where the line has gone off-hook (i.e., the call has been answered), control is transferred to block 74 and port "N" is now treated by the CVPS as connected. Where the line is detected as ringing at block 70, control is transferred to block 76 where the CVPS decides whether the number of rings detected exceeds the predetermined system parameter (e.g., 4 rings before the CVPS automatically answers). If the predetermined number of rings has not been exceeded, control is transferred to block 68. If it has been exceeded, control is transferred to block 78. At block 78 if a telephone emulation port and a voice channel are available for use, control is transferred to block 80; if they are not, control is transferred back to block 68. At block 80 the CVPS sends an off-hook signal via the telephone emulation port to answer the call, plays an appropriate greeting, transfers control over to block 74 to show the port as connected, then goes into a conventional voice mail routine.

Automatic transferring of incoming calls

Once a call has been answered by the CVPS, the caller can request that they be transferred to a particular destination; i.e. a specific intercom or extension number. Using the intercom status indicators on its emulated telephone(s), the CVPS can see in advance whether the destination phone is busy or not. If the phone is busy, the CVPS can either immediately route the caller to the appropriate voice mailbox., or transfer the caller to the destination intercom number. If the phone is not busy, the CVPS can transfer the caller using the telephone key system's call transfer and call announcement features. Systems without telephone emulation capabilities cannot predetermine the busy/idle state of the destination phone, as a result, they cannot automatically connect the caller to the appropriate voice mailbox if the called party is busy.

Automatic message taking

After a call is transferred, the CVPS monitors whether the call is answered or not using the intercom status indicators on the emulated telephone. If the call is not answered within a predetermined period of time or number of rings, the CVPS retrieves the unanswered call and connects it to the appropriate voice mailbox. Voice mail systems for telephone key systems without telephone emulation cannot monitor the status of the transferred call, resulting in an inability to automatically connect the caller to the appropriate voice mailbox.

Message waiting notification

When messages are recorded in voice mailboxes, the CVPS uses telephone emulation to immediately notify the called party that a message has arrived. For example, when connected to either a Merlin™ or Merlin Plus™ telephone key system, the CVPS uses the KSU's Send Message feature to turn on/off the message light on Merlin™ digital feature telephones. Without telephone emulation this capability is not possible.

In addition, the CVPS can also use the KSU's Voice Announcement feature to announce the arrival of a message over the called party's intercom speaker, or, the CVPS can place outgoing calls (e.g., to perform message notification) on any available line appearing on its emulated telephone. Without telephone emulation, outgoing calls must be placed using lines directly connected to the call processing system.

Message retrieval

Messages are retrieved from the voice mailboxes by calling the CVPS and dialing the standard mailbox/password combination using the standard 0–9, *, # keys found on all pushbutton telephones. Calls originating from internal (i.e. Merlin™) telephones connect to the CVPS using outside lines interposed directly with the CVPS. Callers select such a line and dial a predetermined digit or code sequence in order to connect to the CVPS.

Call initiation and termination via telephone emulation

The full digital feature telephone emulation technology also allows outcalling capability for the CVPS. Outcalling is used mainly for the message notification feature, with which the CVPS calls out at a specified external number, such as that of a pager, to notify the user that there are new messages in his/her voice mailbox. With TE, outcalling can be done easily. The CVPS software simply selects an idle TE port and sends signals to go off-hook on an idle CO port. The CVPS knows which CO port is idle by monitoring the LED status for all the CO ports. The CVPS then dials the outside number by sending signals that represent the corresponding dial pad key presses. When the destination party answers, he will hear prompts telling him about the arrival of new messages.

Figure 8:
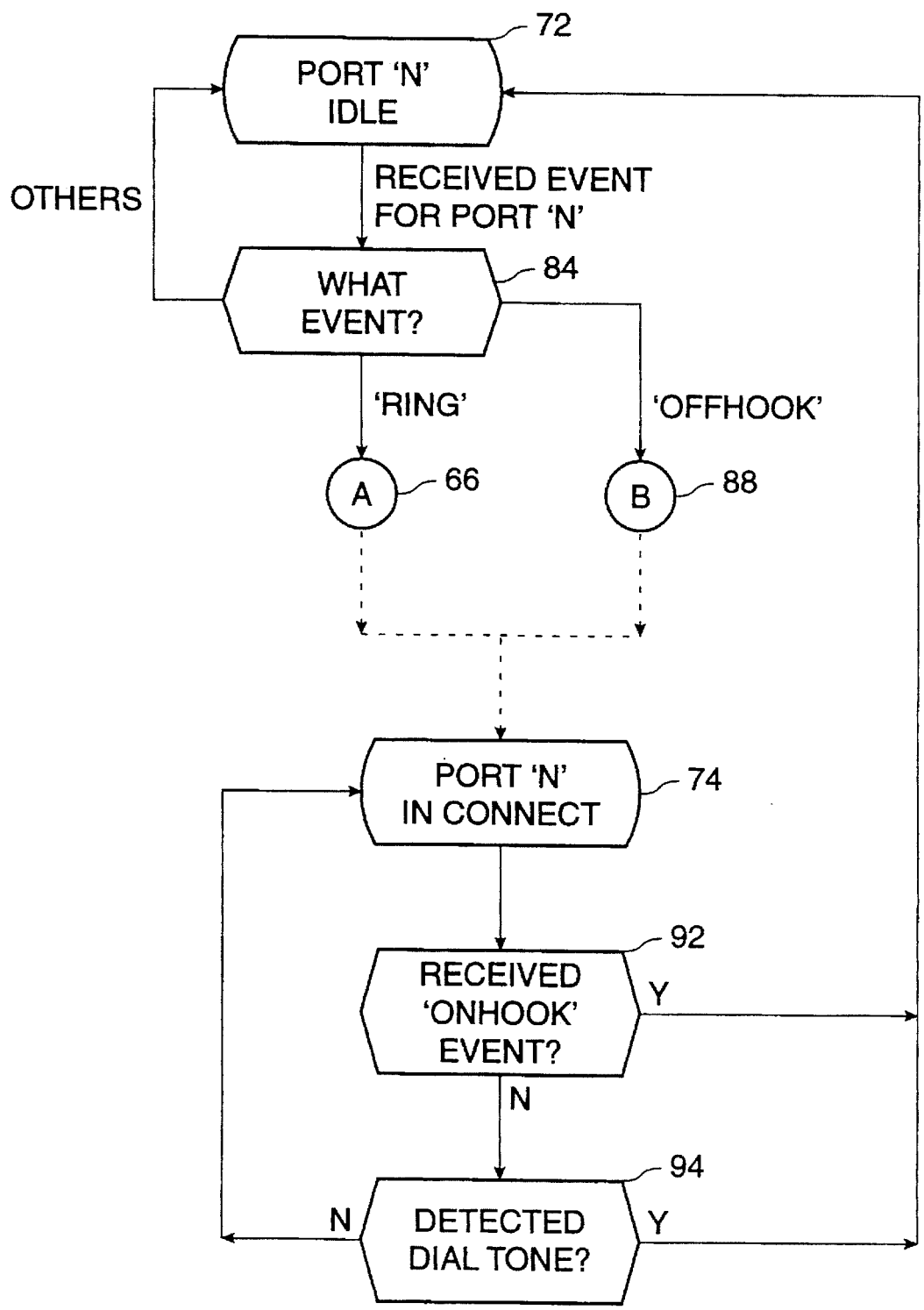
FIG. 8 is a flow chart showing how the telephone call and voice processing system would handle telephone call initiation and termination via full digital feature telephone emulation.

Turning now to FIG. 8 a flowchart describes call initiation and termination using telephone emulation. With port "N" (one of the outside lines) in an idle condition at block 72, if an event such as "off-hook" "on-hook" or "ring" is detected, control is transferred to block 84. At block 84, if a ring is detected, control transfers to block "A" 66 (See FIG. 7), if an off-hook is detected, control transfers to block "B" 88 (See FIG. 6). Other conditions such as on-hook result in transfer to block 72. From blocks 66 and 88 control is eventually transferred to block 74 which causes port "N" to be shown as connected. Control is then transferred to block 92. If block 92 detects an on-hook event, control is passed back to block 72 where port "N" is put into an "idle" condition. Otherwise, control is passed to block 94 where, if a dialtone is detected, control is passed to block 72 and otherwise control is passed to block 74.

Subscriber access via interposed lines

Subscribers are users that own a voice mailbox in the CVPS. One of the major requirements for the subscribers is to be able to access the CVPS to retrieve their voice messages. The call processing capabilities supported by the TE already allow subscribers to access the CVPS externally (i.e., over the central office telephone lines from a remote location). Instead of requesting a call transfer, the caller, in this case the subscriber, can log in to his/her voice mailbox by entering the mailbox number and password.

In addition to accessing the CVPS externally, more often the subscribers need to log in to their voice mailboxes from their own telephones locally. Theoretically this can be done using the TE technology to handle internal (intercom) calls. However, there are two reasons that make this not the case. First, most digital feature telephones are not capable of generating DTMF tones. When DTMF tones need to be generated, such as dialing out to the central office, the KSU interprets the digit key press messages sent by the telephones, and generates the corresponding DTMF tones to be sent to the central office. For intercom calls, the KSU simply makes the connection based on the entered extension number. There are never any DTMF tones generated by the digital feature telephones. This makes the subscriber access via intercom calls useless because the subscriber will not be able to enter any DTMF tones to invoke the CVPS features.

Second, even if the telephones are capable of generating DTMF tones, most KSUs have a small number of intercom talk paths, normally 2 or 3. This is based on the assumption that intercom calls are generally very short in duration, thus a few intercom talk paths are enough to support a large community of extensions. On the other hand, subscriber access normally involves listening to lengthy voice messages, and doing so via intercom calls will result in frequent blocking of the intercom lines thus precluding subscriber'access to the voice mail system and intercom usage.

Therefore, for key systems, it is not practical to implement internal subscriber access via intercom calls. Instead, the CVPS employs the Interposed Line architecture to solve the problem.

FIG. 5 depicts connection of CVPS 18 to KSU 24 and outside lines 10*a*("CO-1"), 10*b*("CO-2") and 10*e*("CO-3"). CO-3 (10*e*) is attached to an interposed line-in port 16 of CVPS 18. Interposed line-out ports 62, 64 are connected to KSU central office line ports 58 and 60.

The KSU sees the interposed line port connections just as normal outside line connections. An external call arriving from CO-3 (10*e*) will pass through the CVPS hardware to appear at port C (58) of KSU 24. However, an external call made from port C (58) (or port D (60)) might be interpreted as a normal outside call, or an instance of subscriber access.

When a user, say Ext. 12 (44), selects port C (58) (or port D (60)) and goes off-hook, the KSU will send signals to all the digital feature telephones (including the CVPS TE ports 54 and 56) to set the LED of the corresponding key on, indicating a user attempt to dial out on that central office port. The CVPS software then sets up the hardware to monitor the first DTMF digit to be dialed by the user. If the digit is a special code for subscriber access (e.g., a "*"), it is interpreted as if the user wants to acquire subscriber access. The CVPS software then sets up the hardware to break the voice connection between port C (58) and CO-3 (10*e*), and establish voice connection between port C (58) and the allocated CVPS voice channel. It also puts the termination of CO-3 (10*e*) into an off-hook condition to temporarily busy out that outside line, so that subsequent incoming calls on CO-3 (10*e*) will hear a busy signal. The CVPS then prompts the subscriber for the mailbox number and password to log in. Since the interposed line port connection appears to the KSU as a normal outside line, any digit key pressed by the subscriber will be converted to real DTMF tones by the KSU, thus allowing the CVPS to detect DTMF inputs for the user interface. This solves the fundamental problem of lack of DTMF tone generation by the telephones.

Once the subscriber finishes the session, port C (58) is physically reconnected to CO-3 (10*e*) in an on-hook condition.

The setup at port D (60) is similar, except that there is no outside line connected at the other end. This sets up port D (60) for subscriber access only, as long as there are vacant central office ports in the KSU. This is preferable to the configuration at port C (58), since at port C (58) an outside line CO-3 (10*e*) is taken out of use or blocked during subscriber access which precludes incoming calls on that line during such subscriber access.

When doing subscriber access via the Interposed Lines, no intercom talk path is used, thus freeing the CVPS from dependency on the scarce resource of the KSU intercom talk path. The Interposed Line architecture also allows great flexibility in terms of multiplicity of subscriber access. There can be as many simultaneous subscriber access as the number of Interposed Line connections, and depending on whether there are vacant central office ports on the KSU, those ports can be tailored for frequent use for subscriber access.

Figure 6:
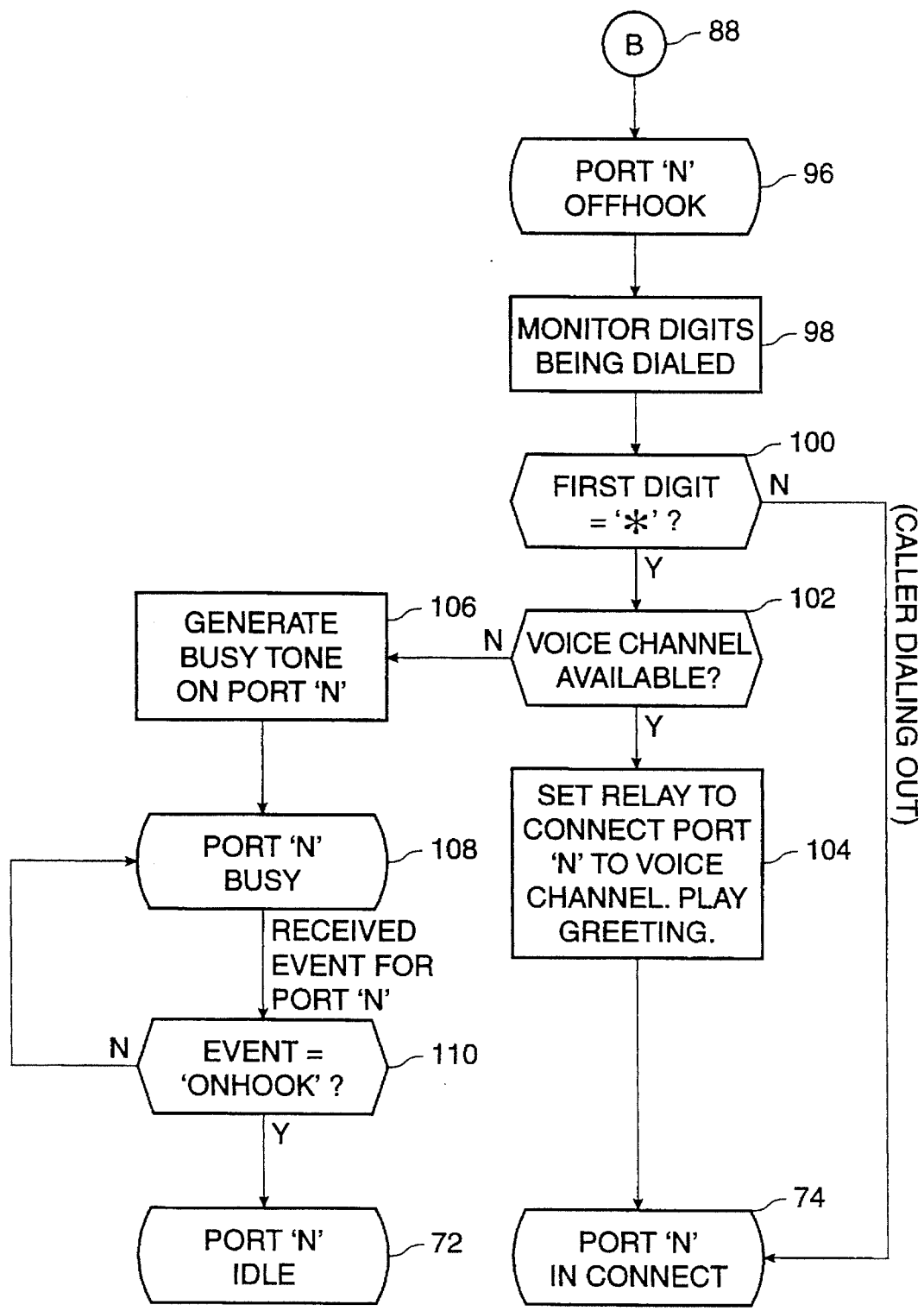
FIG. 6 is a flow chart showing how the telephone call and voice processing system would handle subscriber access to the telephone call and voice processing system via full digital feature telephone emulation where interposed lines are implemented.

Turning now to FIG. 6 the software control of subscriber access via telephone emulation and interposed lines is described. The routine is entered from block "B" (88) of FIG. 8. Block 88 transfers control to block 96 which causes port "N" to be shown as off-hook. Control then passes to block 98 where the digits dialed by the telephone are monitored over the outside line interface. Block 100 transfers control to block 74 if the first digits pressed are not a predetermined code sequence to initiate subscriber access— in this case, "*". If "*" is pressed, control passes to block 102 where, if a voice channel is available, control is passed to block 104 and otherwise control is passed to block 106. At block 104 a relay is commanded to connect port "N" to the voice channel, a greeting from the voice mail system is played, and control is passed to block 74. At block 106 a busy tone is generated for port "N" and control is passed to block 108 where port "N" is set to busy on the CVPS and KSU. At block 110, when the port "N" goes on-hook, control is passed to block 72. Otherwise control goes back to block 108 to await an on-hook condition.

Self configuration with full digital feature telephone emulation

The CVPS uses full digital feature telephone emulation to assist the installer in customizing the software configuration of the CVPS for particular types of key telephone systems. For example, the CVPS can determine the type of Merlin™ KSU to which it is connected. As a result, the CVPS can automatically configure itself to contain as many mailboxes as there are possible intercoms, and it can assign mailbox numbers that match the intercom numbering scheme used by the KSU.

In addition, the CVPS uses telephone emulation to determine the feature content of the KSU it is connected to. For example, the CVPS can determine whether or not a KSU contains the call transfer feature. If it does, the CVPS will use this feature when routing incoming calls; if not the CVPS will use alternative techniques.

The Self Configuration feature allows the CVPS to detect the physical setup of the system, such as the KSU model and feature package, the number of outside lines connected, the number of Interposed Lines and TE ports connected, etc., and then configure the CVPS software accordingly. This is performed automatically during the power up initialization, without the need of any manual configuration procedures by a system administrator or installer. Once the self configuration process is complete, the CVPS is ready to be used. Anytime the system needs to be reconfigured, such as after adding or removing an outside line, all that is required is to reboot the system after the wiring is in place.

The self configuration feature is made available by the telephone emulation technology. By being able to completely emulate a digital feature telephone, the CVPS software can perform intelligent actions for identifying the system configuration, just like an experienced system administrator or installer will do. For example, to detect the presence (or absence) of an outside line at a certain central office line port, the software will send signals to the KSU to select the particular port, and go off-hook. It will then check for a dial tone as an indication of the presence of an outside line connection. Similarly, to identify the KSU model and feature package, the software will send signals to invoke the features which are specific to a particular KSU model and feature package, and from the response signals sent back by the KSU, determine whether it is the case. Information particular to that given KSU model and feature package may then be read from a read only memory or similar storage device associated with the CVPS and used to establish the configuration of the CVPS.

Hardware

The CVPS comprises a CVPS motherboard, a CVPS power supply, a CVPS disk storage unit, and a CVPS plastic enclosure. The CVPS plastic enclosure, disk storage unit and power supply are conventional, well known to those of skill in the art, and need not be further described herein.

Figure 2:
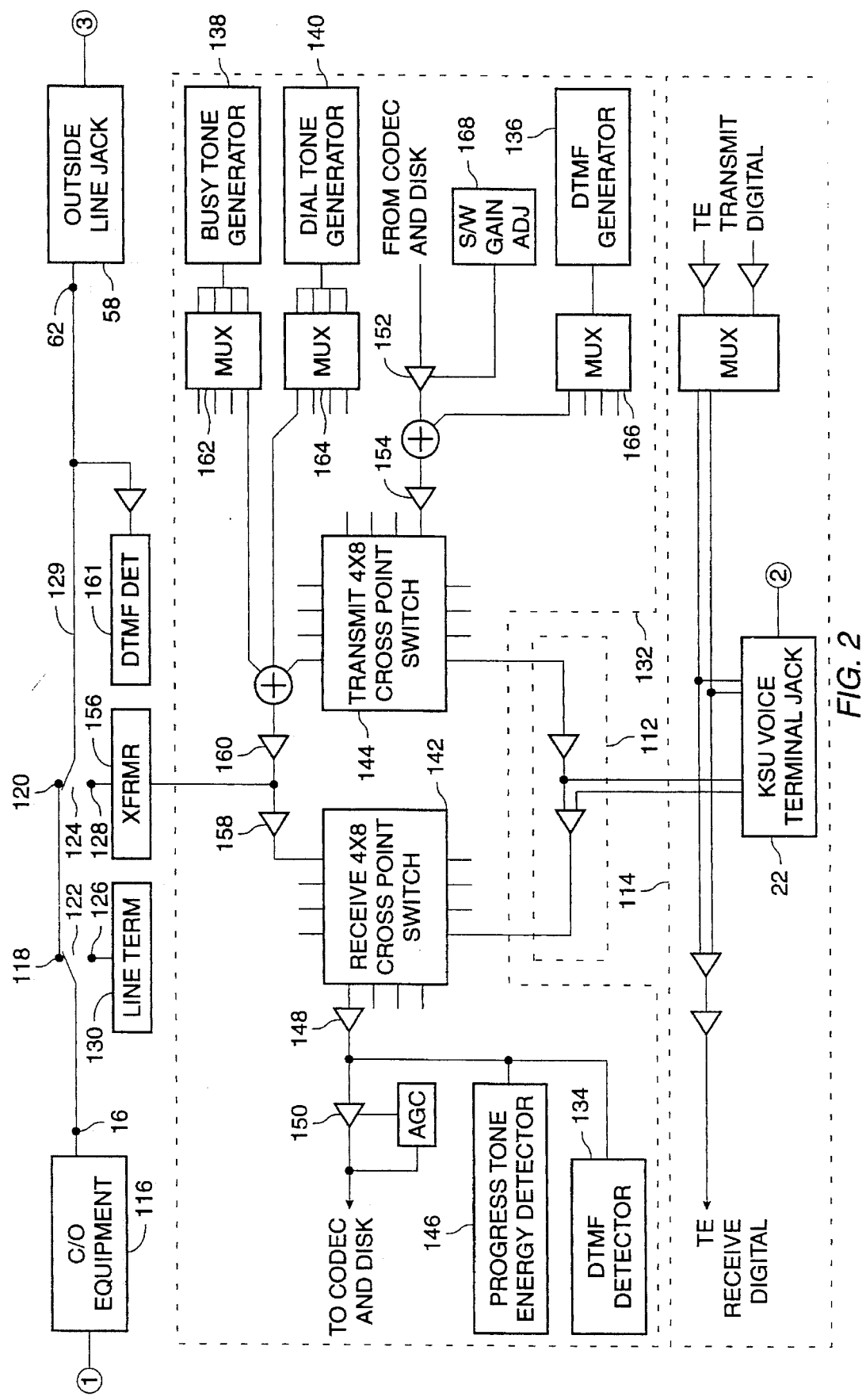
FIG. 2 is a simplified block diagram of a portion of the telephone call and voice processing system.

A schematic diagram of the CVPS motherboard is shown at FIG. 2. FIG. 2 depicts one telephone emulation interface, one central office equipment interface, one interface to Merlin™ outside line jacks, one interface to the disk storage unit, and one set of call and voice processing control circuits. The actual CVPS preferably contains 2–4 sets of all such circuits. In addition, the microprocessor control system which is of conventional design and well known to those of skill in the art is not shown.

Telephone emulation interfaces

The circuits depicted in the bottom portion of FIG. 2 provide the telephone emulation interface to the Merlin™ digital feature telephone port. Call progress information and voice recording to and from the disk storage unit are communicated via these circuits using a communications scheme similar to that used between a Merlin™ KSU and a digital feature telephone. The circuit outlined by box 112 comprises the analog/voice interface circuitry. The circuit outlined by box 114 comprises the digital information interface circuitry.

Merlin™ outside line jack & central office equipment interfaces

The circuits depicted in the top portion of FIG. 2 provide the interface to both the Merlin's™ outside line jack 58 and the central office equipment 116 (i.e. incoming telephone line). In the idle condition, incoming and outgoing calls pass unaffected through the normally closed relay contacts 118, 120 of interposed line relays 122, 124. When messages are being retrieved by the Merlin™ telephones, the interposed line relays 122, 124 open, connecting relay contacts 126, 128 respectively with the central office equipment 116 and voice channel 129 and thus connecting the caller to the disk storage unit and busying out the incoming line 116 by connecting it to a line termination 130 through relay 122.

Tone generators, detectors, switching matrices, and CODECs

The circuits depicted in the center portion of FIG. 2 within box 132 represent the CVPS call and voice processing circuitry. Included in this circuitry are: DTMF detectors 134 which are used for detecting DTMF signals received over the outside lines or from the KSU; various tone generators such as a DTMF tone generator 136, a busy tone generator 138 and a dial tone generator 140 which are used for telephone network signalling purposes and which are shared by all interface circuits; a pair of 4×8 crosspoint switches 142, 144 which are used to connect callers to the disk (voice) storage unit (note: unit 142 is a receive 4×8 crosspoint switch and unit 144 is a transmit crosspoint switch); a call progress tone detector 146 used for detecting telephone network signaling tones such as dial tones, busy tones, etc.; and amplifiers 148, 150, 152, 154 and CODECs (not shown) which are used to process the voice signals for storage on the disk, and for converting the digital information stored on the disk back into audio signals for insertion into the telephone lines.

Figure 3:
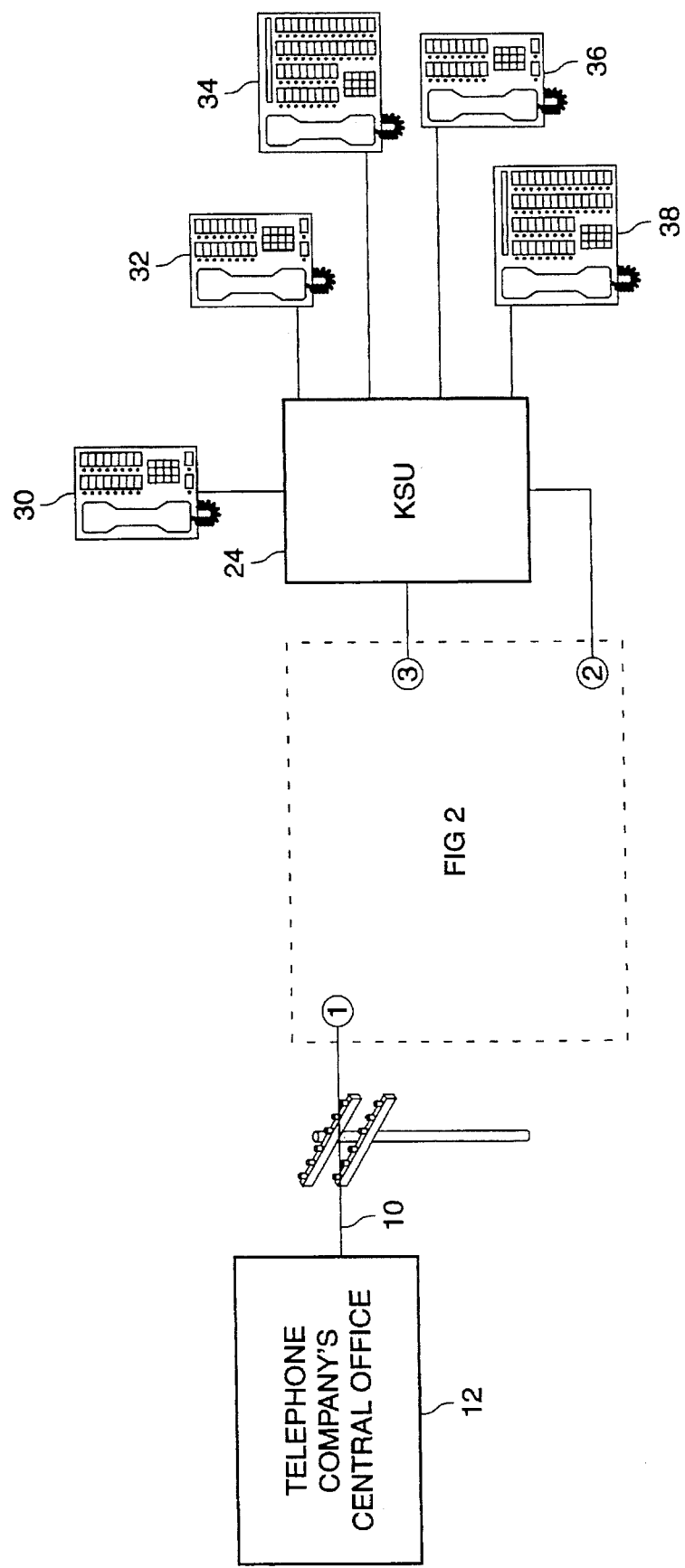
FIG. 3 is a diagram combining FIG. 1 and FIG. 2.

FIG. 3 combines portions of FIG. 1 and FIG. 2 to show additional detail about how the CVPS interacts with the KSU and the incoming telephone lines (outside lines).

Transformer 156 interfaces the signal processing circuitry to the telephone network in a conventional manner and amplifiers 158, 160 adjust audio levels to the proper levels.

DTMF detector 161 is used for detecting the first digit dialed in order to determine whether a call to the voice mail system, an outgoing call to the telephone network, or some other function is desired.

Multiplexers 162, 164, 166 mix the signals from the tone generators 138, 140, and 136 with the telephone audio for output through crosspoint switch 144.

A gain adjustment 168 under software control permits software control of the audio level of the playback of messages stored on the disk.

Figure 4:
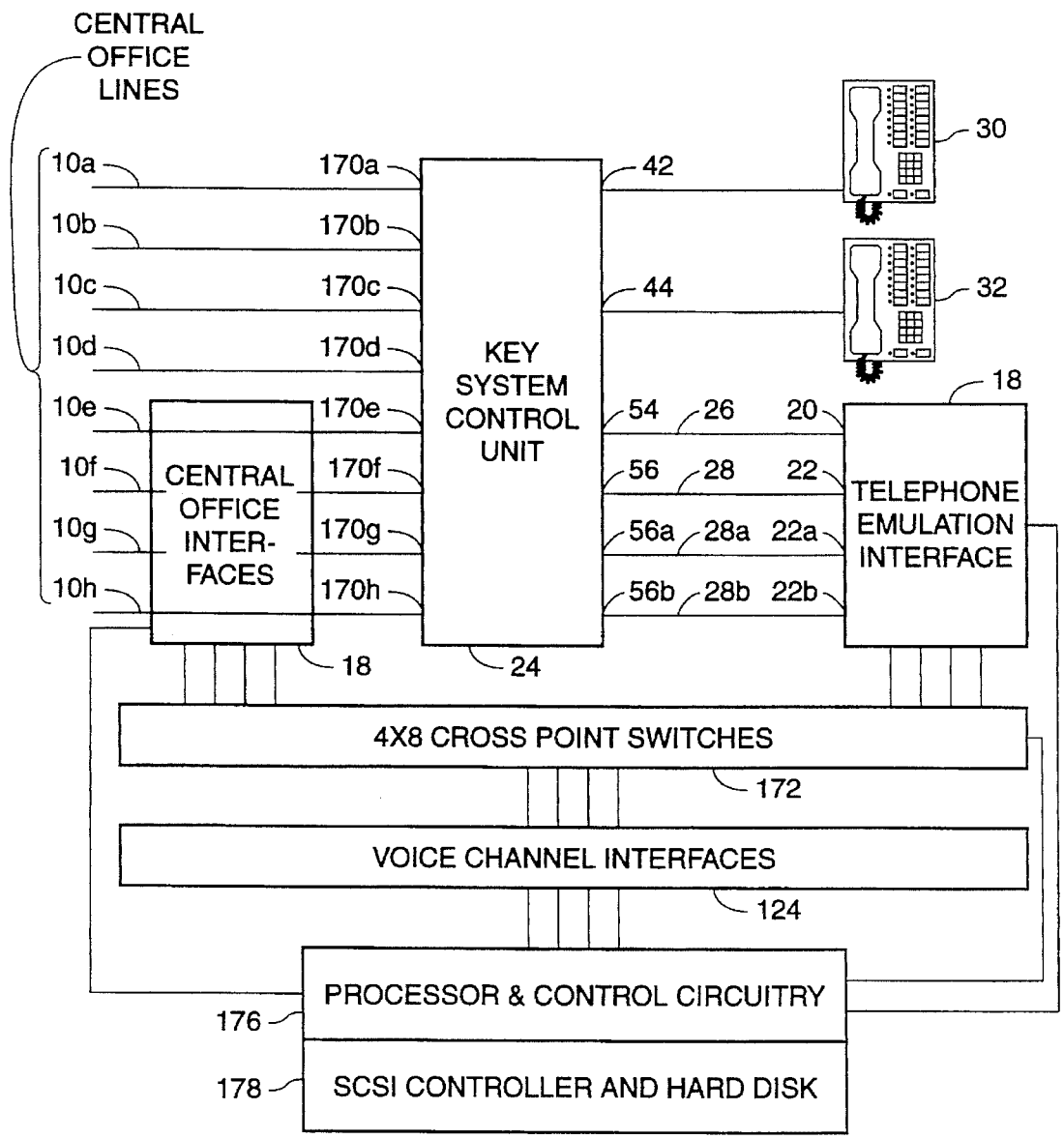
FIG. 4 is an overall block diagram of the components of the telephone call and voice processing system.

FIG. 4 shows an overall block diagram of the CVPS components. Central office lines 10a–10d are connected directly to Central office line ports 170a–170d of KSU 24. Central office lines 10e–10h are connected in interposed fashion through CVPS 18 to central office line ports 170e–170h of KSU 24. Digital feature telephones 30, 32 are connected to digital feature telephone ports 42, 44 of KSU 24. CVPS 18 TE ports 20, 22, 22a, 22b are connected to KSU digital feature telephone ports 54, 56, 56a, 56b over lines 26, 28, 28a, 28b. The audio portions of the CVPS central office interfaces and telephone emulation interfaces are connected to 4×8 crosspoint switches 172 which are in turn connected to processing and control circuitry 176 (also connected to the interfaces 174 and crosspoint switches 172) which is connected to SCSI controller and hard disk 178 on which is stored in digitized audio form the voice messages played by the CVPS and the voice mail. Such systems are well known to those of skill in the art and need not be described further herein.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A call and voice processing system for use with a telephone key system, said telephone key system of a specific model type, said telephone key system having at least a first central office telephone port adapted for connection to a central office telephone line and at least a first and a second digital feature telephone port, said first digital feature telephone port not connected to a digital feature telephone and said second digital feature telephone port coupled to a user's digital feature telephone, said call and voice processing system comprising:

a voice mail system including:
  a plurality of user voice mail boxes, at least one of said user voice mail boxes associated with a user;
  at least one telephone emulation port adapted for communicating both digital control data and voice signals between said voice mail system and the telephone key system, said at least one telephone emulation port adapted to be coupled to the telephone key system at least at the first digital feature telephone port through which both said digital control data and said voice signals are communicated;
  a switch capable of assuming one of either of a normal state and an interrupt state, said switch having a common node, a normally closed node and a normally open node, said common node connected to said normally closed node only while said switch is in said normal state and said common node connected to said normally open node only when said switch is in said interrupt state, said interrupt state entered while said user seeks to access one of said user voice mail boxes from said user's digital feature telephone;
  a first line-in port adapted to be directly coupled to both a central office telephone line and said normally closed node while said switch is in said normal state; and
  a first line-out port adapted to be directly coupled to both the first central office telephone port of the telephone key system and said common node;

wherein said voice mail system is directly coupled to said normally open node so that the central office telephone line is connected to the first central office telephone port of the telephone key system through said switch while said switch is in said normal state and said voice mail system is connected to the first central office telephone port of the telephone key system through said switch while said switch is in said interrupt state.

2. A call and voice processing system according to claim 1 wherein said voice mail system further includes:

control means, while in said interrupt state, for being controlled by DTMF tones selected by said user at said user's digital feature telephone, said DTMF tones generated by the telephone key system and transmitted from the telephone key system, through the first central office telephone port of the telephone key system through said first line-out port, through said common node, through said switch, through said normally open node and to said voice mail system.

3. A call and voice processing system according to claim 2 wherein said interrupt state is entered upon a recognition by said voice mail system of a predetermined sequence of DTMF tones corresponding to a predetermined sequence of telephone key button pushes received by said voice mail system from the telephone key system.

4. A call and voice processing system according to claim 2 wherein said voice mail system further includes:

a self configuration means for performing a self configuration of said voice mail system, said self configuration means adapted to transmit and monitor signals between said terminal emulation port of said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

5. A call and voice processing system according to claim 3 wherein said voice mail system further includes:

a self configuration means for performing a self configuration of said voice mail system, said self configuration means adapted to transmit and monitor signals between said terminal emulation port of said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

6. A call and voice processing system according to claim 1 wherein said voice mail system further includes:

control means, while in said interrupt state, for being controlled by predetermined sequences of telephone key pushes selected by said user at said user's digital feature telephone, information corresponding to said sequences of telephone key pushes transmitted from the telephone key system, through the first digital feature telephone port of the telephone key system, through said first telephone emulation port to said voice mail system.

7. A call and voice processing system according to claim 6 wherein said interrupt state is entered upon a recognition by said voice mail system of information corresponding to one of said predetermined sequences of telephone key pushes, said information transmitted from the telephone key system, through the first digital feature telephone port of the telephone key system, through said first telephone emulation port and thereby received by said voice mail system.

8. A call and voice processing system according to claim 6 wherein said voice mail system further includes:

a self configuration means for performing a self configuration of said voice mail system, said self configuration means adapted to transmit and monitor signals between said terminal emulation port off said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

9. A call and voice processing system according to claim 7 wherein said voice mail system further includes:

a self configuration means for performing a self configuration of said voice mail system, said self configuration means adapted to transmit and monitor signals between said terminal emulation port of said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

10. A call and voice processing system according to claim 1 wherein said voice mail system further includes:

a self configuration means for performing a self configuration of said voice mail system, said self configuration means adapted to transmit and monitor signals between said terminal emulation port of said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

11. A call and voice processing system for use with a telephone key system, said telephone key system of a specific model type, said telephone key system having at least a first central office telephone port adapted for coupling to a central office telephone line and at least a first and a second digital feature telephone port, said first digital feature telephone port not connected to a digital feature telephone and said second digital feature telephone port coupled to a user's digital feature telephone, said call and voice processing system comprising:

a voice mail system including:

a plurality of user voice mail boxes, at least one of said user voice mail boxes associated with a user;

at least one telephone emulation port adapted for communicating both digital control data and voice signals between said voice mail system and the telephone key system, said at least one telephone emulation port adapted to be coupled to the telephone key system at least at the first digital feature telephone port through which both said digital control data and said voice signals are communicated; and a self configuration means for performing a self configuration of said voice mail system, said self configuration means adapted to transmit and monitor signals between said terminal emulation port of said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

12. A call and voice processing system for use with a telephone key system, said telephone key system of a specific model type, said telephone key system having at least a first central office telephone port adapted for coupling a central office telephone line and at least a first and a second digital feature telephone port, said first digital feature telephone port not connected to a digital feature telephone and said second digital feature telephone port coupled to a user's digital feature telephone, said call and voice processing system comprising:

a voice mail system including:

a plurality of user voice mail boxes, at least one of said user voice mail boxes associated with a user;

at least one telephone emulation port adapted for communicating both digital control data and voice signals between said voice mail system and the telephone key system, said at least one telephone emulation port adapted to be coupled to the telephone key system at least at the first digital feature telephone port through which both said digital control data and said voice signals are communicated;

at least one port in addition to said at least one telephone emulation port, said at least one port adapted to communicate voice signals between said voice mail system and the telephone key system and adapted to be directly coupled to the first central office telephone port of the telephone key system;

a self configuration means for performing a self configuration of said voice mail system, said self configuration means adapted to transmit and monitor signals between said terminal emulation port of said voice mail system and the first digital feature telephone port of the telephone key system and, based upon said signals, determine (a) which central office telephone ports of the telephone key system have operable central office telephone lines attached thereto, (b) which digital feature telephone ports of the telephone key system have digital feature telephones attached thereto, and (c) the specific model type of the telephone key system; and a configuration memory for storing information indicative of (a) which central office telephone ports of the telephone key system have operable central office telephone lines attached thereto, (b) which digital feature telephone ports of the telephone key system have digital feature telephones attached thereto, and (c) the specific model type of the telephone key system, said configuration memory adapted to be written to by said self configuration means after performing a self configuration of said voice mail system.

\* \* \* \* \*

UNITED STATES PATENT AND TRADEMARK OFFICE
CERTIFICATE OF CORRECTION

PATENT NO.   : 5,471,523
DATED        : November 28, 1995
INVENTOR(S)  : Smith, et al.

It is certified that error appears in the above-indentified patent and that said Letters Patent is hereby corrected as shown below:

Column 4, line 16, delete "typical."

Column 7, line 64, replace "subscriber's" with --subscriber--

Column 10, line 23, after "idle condition" insert --or "normal state"--

Column 10, after line 31 insert

--     As used in the claims, relay or "switch" 124 has a "common node" 129 which is connected to "normally closed node" 120 while switch 124 is in the normal state, allowing one of the central office telephone ports of the telephone key system to be connected to a central office telephone line through another switch 122 as shown in Fig. 2. When the "interrupt state" is entered, common node 129 is instead connected to "normally open node" 128, thus connecting the telephone key system to the voice mail system through one of the central office telephone ports of the telephone key system.--

UNITED STATES PATENT AND TRADEMARK OFFICE
CERTIFICATE OF CORRECTION

PATENT NO. : 5,471,523
DATED : November 28, 1995
INVENTOR(S) : Smith, et al.

It is certified that error appears in the above-indentified patent and that said Letters Patent is hereby corrected as shown below:

In the Claims

Column 13, line 30, replace "off" with --of--

Column 15, line 12, after "coupling" insert --to--.

Signed and Sealed this

Sixth Day of August, 1996

Attest:

BRUCE LEHMAN

Attesting Officer

Commissioner of Patents and Trademarks